US012658153B2

(12) United States Patent
Matsui

(10) Patent No.: US 12,658,153 B2
(45) Date of Patent: Jun. 16, 2026

(54) ELECTRONIC PAPER AND CONTROL METHOD FOR ELECTRONIC PAPER FOR MAINTAINING DISPLAY QUALITY IN HIGH-TEMPERATURE ENVIRONMENT

(71) Applicant: SHARP KABUSHIKI KAISHA, Sakai City (JP)

(72) Inventor: Kuniaki Matsui, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/019,028

(22) Filed: Jan. 13, 2025

(65) Prior Publication Data

US 2025/0246161 A1 Jul. 31, 2025

(30) Foreign Application Priority Data

Jan. 30, 2024 (JP) ................................ 2024-011979

(51) Int. Cl.
*G09G 3/34* (2006.01)

(52) U.S. Cl.
CPC ......... *G09G 3/344* (2013.01); *G09G 2310/08* (2013.01); *G09G 2320/041* (2013.01); *G09G 2360/144* (2013.01)

(58) Field of Classification Search
CPC ............... G09G 3/344; G09G 2310/08; G09G 2320/041; G09G 2360/144
See application file for complete search history.

(56) References Cited

U.S. PATENT DOCUMENTS

| | | | | |
|---|---|---|---|---|
| 2007/0052665 | A1* | 3/2007 | Zhou | G09G 3/344 345/107 |
| 2009/0237393 | A1 | 9/2009 | Saito | |
| 2021/0142740 | A1* | 5/2021 | Gao | G02F 1/1676 |
| 2024/0078069 | A1* | 3/2024 | Kim | G06F 3/14 |
| 2024/0339087 | A1* | 10/2024 | Uratani | G02F 1/1685 |

FOREIGN PATENT DOCUMENTS

| | | |
|---|---|---|
| JP | 2009-229832 A | 10/2009 |

* cited by examiner

*Primary Examiner* — Kwang-Su Yang
(74) *Attorney, Agent, or Firm* — ScienBiziP, P.C.

(57) ABSTRACT

An electronic paper includes: a display panel including color particles that move by being applied with a voltage; a temperature sensor that detects a temperature; a display controller that controls a write operation of writing an image on the display panel by applying a voltage to the color particles; and a refresh timing determiner that determines a refresh timing for executing a refresh operation in which, after the write operation previously performed, the write operation is performed again, wherein the refresh timing determiner determines the refresh timing based on a detected temperature by the temperature sensor, and the display controller executes the refresh operation at the refresh timing.

9 Claims, 5 Drawing Sheets

ELECTRONIC PAPER AND CONTROL METHOD FOR ELECTRONIC PAPER FOR MAINTAINING DISPLAY QUALITY IN HIGH-TEMPERATURE ENVIRONMENT

CROSS-REFERENCE TO RELATED APPLICATION

The present application claims priority from Japanese Application JP2024-011979, the content to which is hereby incorporated by reference into this application.

BACKGROUND OF THE DISCLOSURE

1. Field of the Disclosure

The disclosure relates to an electronic paper and a control method for an electronic paper.

2. Description of the Related Art

In the related art, an electronic paper is known as a display device that can be rewritten any number of times and has low power consumption. In an electrophoretic display device provided in a display region of a known electronic paper, in a case where an image is held while being displayed on a display, a refresh step of shifting to an image holding step and, after a lapse of a predetermined time, redisplaying the image is executed to prevent a decrease in contrast over time.

SUMMARY OF THE DISCLOSURE

However, in the known electronic paper, although a display content can be maintained without power supply, a display quality is actually deteriorated in a gradual manner. For this reason, there has been a demand for an electronic paper capable of maintaining a display quality even after a long time in a high-temperature environment.

The disclosure has been made in view of the above-described problem, and an object thereof is to provide an electronic paper and a control method for an electronic paper that can maintain a display quality even after a long time in a high-temperature environment.

An electronic paper according to a first aspect of the disclosure includes a display panel, a temperature sensor, a display controller, and a refresh timing determiner. The display panel includes color particles that move by being applied with a voltage. The temperature sensor detects a temperature. The display controller controls a write operation of writing an image on the display panel by applying a voltage to the color particles. The refresh timing determiner determines a refresh timing for executing a refresh operation in which, after the write operation previously performed, the write operation is performed again. The refresh timing determiner determines the refresh timing based on a detected temperature by the temperature sensor. The display controller executes the refresh operation at the refresh timing determined.

A control method for an electronic paper according to a second aspect of the disclosure is a method for controlling an electronic paper provided with a display panel including color particles that move by being applied with a voltage. The control method for an electronic paper includes detecting a temperature, executing a write operation of writing an image on the display panel by applying a voltage to the color particles, determining a refresh timing for executing a refresh operation in which, after the write operation previously performed, the write operation is performed again, and executing the refresh operation at the refresh timing determined.

According to the disclosure, an electronic paper and a control method for an electronic paper that can maintain a display quality even after a long time in a high-temperature environment can be provided.

DETAILED DESCRIPTION OF THE DISCLOSURE

Figure 1:
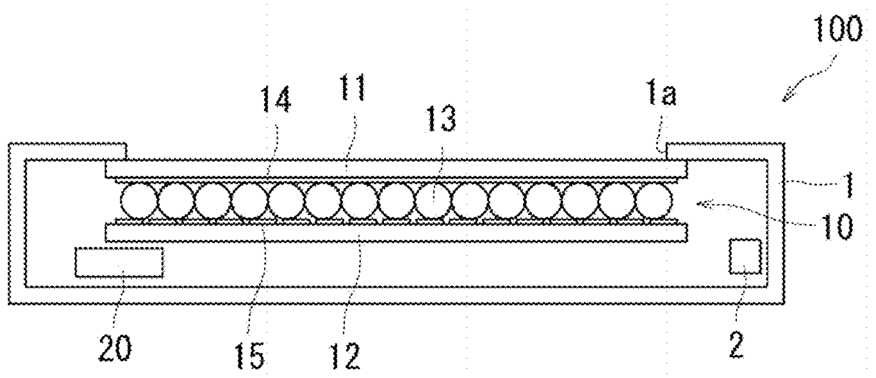
FIG. 1 is a cross-sectional view schematically illustrating a structure of an electronic paper 100 according to a first embodiment of the disclosure.

Embodiments of the disclosure will be described below with reference to the drawings. In the drawings, the same or equivalent components are denoted by the same reference numerals and signs, and description thereof will not be repeated.

First Embodiment

1.1 Structure of Electronic Paper 100

An electronic paper 100 according to a first embodiment of the disclosure will be described with reference to FIG. 1 to FIG. 4. FIG. 1 is a cross-sectional view schematically illustrating a structure of the electronic paper 100 according to the first embodiment of the disclosure.

As illustrated in FIG. 1, the electronic paper 100 functions as a display device that displays an image. The electronic paper 100 is used as, for example, an electronic shelf label, an electronic advertisement, an electronic book terminal, or an electronic notebook. The electronic paper 100 may be used as a device other than an electronic shelf label, an electronic advertisement, an electronic book terminal, and an electronic notebook.

The electronic paper 100 includes a housing 1 and a display panel 10. The housing 1 accommodates the display panel 10. The housing 1 includes an opening 1*a* in a front surface.

The display panel 10 displays an image. The display panel 10 is formed to be larger than the opening 1*a* of the housing 1, and is disposed so as to close the opening 1*a*. A region of the display panel 10 corresponding to the opening 1*a* is a display region in which an image is visually recognized by a user.

The display panel 10 includes a first substrate 11, a second substrate 12 disposed to face the first substrate 11, a plurality of microcapsules 13, a first electrode 14, and a second electrode 15.

The first substrate 11 is formed of a transparent plate member or sheet member made of glass, resin, or the like. On the surface of the first substrate 11 on the outer side (side opposite to the second substrate 12), an antireflection film may be formed or water-repellent finishing may be performed. The second substrate 12 is formed of a plate member or a sheet member made of glass, resin, or the like.

The microcapsules 13 are disposed between the first substrate 11 and the second substrate 12. For example, one layer of the microcapsules 13 is laid between the first substrate 11 and the second substrate 12. The microcapsule 13 has a substantially spherical shape. The microcapsule 13 has a diameter of, for example, several tens of μm or more and several hundreds of μm or less.

Figure 2:
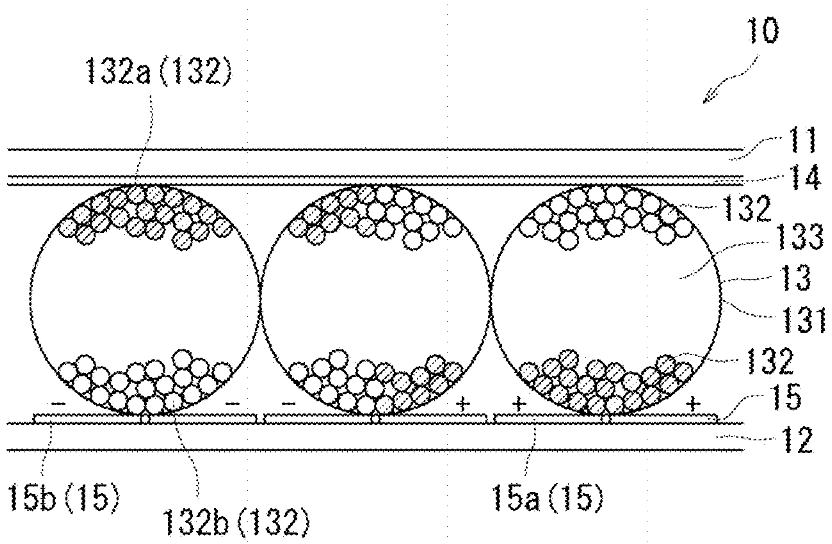
FIG. 2 is an enlarged view schematically illustrating a structure around microcapsules 13 of the electronic paper 100.

FIG. 2 is an enlarged view schematically illustrating a structure around the microcapsules 13 of the electronic paper 100. As illustrated in FIG. 2, the microcapsule 13 includes a film 131, a plurality of color particles 132, and a dispersion liquid 133. The film 131 is transparent, for example. The film 131 is a film made of transparent resin, for example. The material of the film 131 is not particularly limited, and is, for example, urethane resin, melanin resin, or rubber.

The color particles 132 are pigments. The color particles 132 constitute a part of an image displayed on the display panel 10. The color particles 132 move by being applied with a voltage. In the present embodiment, moving includes migrating and rotating. In the present embodiment, the color particles 132 are particles that are electrophoresed. Specifically, the color particles 132 move in the dispersion liquid 133 in accordance with a voltage applied between the first electrode 14 and the second electrode 15. As a result, a predetermined image is displayed on the display panel 10.

The color particles 132 are, for example, organic or inorganic particles. In the present embodiment, the color particles 132 include, for example, black particles 132*a* as a black pigment and white particles 132*b* as a white pigment. The black particles 132*a* as the black pigment are not particularly limited, and include, for example, carbon black or titanium black. The white particles 132*b* as the white pigment are not particularly limited, and include, for example, titanium dioxide or antimony trioxide. The black particles 132*a* and the white particles 132*b* are examples of the "color particles" in the disclosure.

The black particles 132*a* are negatively charged, for example. On the other hand, the white particles 132*b* are positively charged, for example. That is, the black particles 132*a* and the white particles 132*b* have different colors from each other and are charged to different polarities from each other. Note that the black particles 132*a* may be positively charged and the white particles 132*b* may be negatively charged.

In the present embodiment, as described above, the color particles 132 include the black pigment and the white pigment. However, the color particles 132 may include pigments of other colors instead of the black pigment and the white pigment. The color particles 132 may include pigments of other colors in addition to the black pigment and the white pigment. As the pigments of other colors, for example, a yellow pigment, a red pigment, a blue pigment, a white pigment and/or a green pigment may be used.

The dispersion liquid 133 is transparent, for example. The dispersion liquid 133 is a liquid having insulation properties. The dispersion liquid 133 is not particularly limited, and may contain, for example, water, an alcohol-based solvent, esters, ketones, aliphatic hydrocarbon, alicyclic hydrocarbon, aromatic hydrocarbon, or oils. In the present embodiment, the dispersion liquid 133 contains, for example, aliphatic hydrocarbon.

The first electrode 14 and the second electrode 15 are disposed to face each other so as to sandwich the microcapsules 13.

The first electrode 14 is disposed, for example, on the outer side (first substrate 11 side) with respect to the microcapsules 13. The first electrode 14 may be formed on the first substrate 11, for example. In the present embodiment, the first electrode 14 is formed on the first substrate 11.

The first electrode 14 is formed of a conductive material having transparency. The first electrode 14 is not particularly limited, and is formed of indium tin oxide (ITO), for example. In the present embodiment, the first electrode 14 is a common electrode. For example, one first electrode 14 is provided for a plurality of (here, all) pixels. The first electrode 14 is grounded and has a ground potential, for example.

The second electrode 15 is disposed, for example, on the inner side (second substrate 12 side) with respect to the microcapsules 13. The second electrode 15 may be formed on the second substrate 12, for example. In the present embodiment, the second electrode 15 is formed on the second substrate 12.

The second electrode 15 is not particularly limited, and is formed of, for example, a metal material such as copper. In the present embodiment, the second electrode 15 is a pixel electrode. The second electrode 15 is formed in a substantially rectangular shape in a plan view, and a plurality of second electrodes 15 are provided. The plurality of second electrodes 15 are disposed adjacent to each other with a predetermined gap therebetween.

For example, when a positive potential is applied to a second electrode 15*a*, the black particles 132*a* between the second electrode 15*a* and the first electrode 14 are attracted to the second electrode 15*a*. The white particles 132*b* between the second electrode 15*a* and the first electrode 14 are attracted to the first electrode 14.

On the other hand, for example, when a negative potential is applied to a second electrode 15*b*, the black particles 132*a* between the second electrode 15*b* and the first electrode 14 are attracted to the first electrode 14. The white particles 132*b* between the second electrode 15*b* and the first electrode 14 are attracted to the second electrode 15*b*.

As illustrated in FIG. 1, the electronic paper 100 further includes a temperature sensor 2 and a control device 20.

The temperature sensor 2 detects a temperature. The temperature sensor 2 is disposed, for example, inside the housing 1 at a portion on a side opposite to the control device 20. In other words, the temperature sensor 2 is disposed at a predetermined interval from the control device 20. Thus, a detected temperature T by the temperature sensor 2 can be prevented from increasing due to heat of the control device 20.

The temperature sensor 2 is provided to measure the ambient temperature of the electronic paper 100, for example. For example, a vent hole may be provided at a portion of the housing 1 facing a temperature detection element of the temperature sensor 2. Alternatively, the temperature detection element of the temperature sensor 2 may be exposed to the outside of the housing 1. The detected temperature T by the temperature sensor 2 may be corrected and used as the ambient temperature of the electronic paper 100.

The temperature sensor 2 is not particularly limited, and is, for example, a thermocouple, a thermistor, or an infrared sensor. The temperature sensor 2 transmits a detection result (detected temperature T) to the control device 20.

The control device 20 controls various operations of the electronic paper 100. The control device 20 controls the display panel 10. As a result, the electronic paper 100 displays a predetermined image.

1.2 Functional Configuration of Electronic Paper 100

Figure 3:
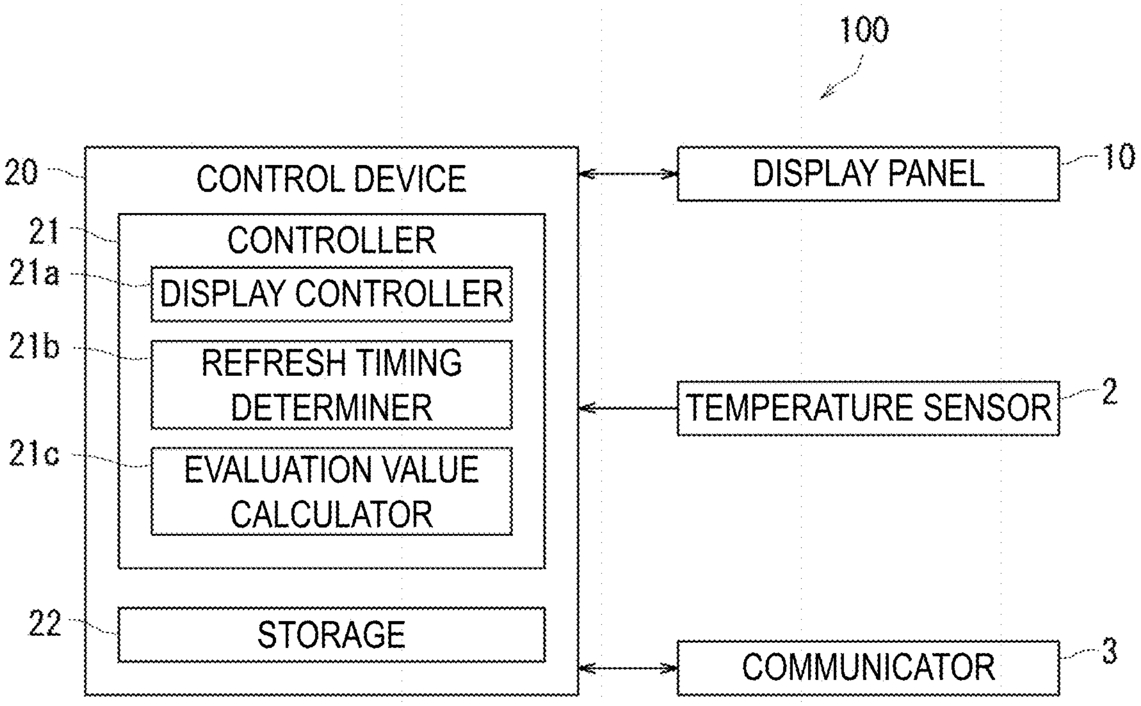
FIG. 3 is a block diagram illustrating a configuration of the electronic paper 100.

Next, a configuration of the electronic paper 100 will be described with reference to FIG. 3. FIG. 3 is a block diagram illustrating a configuration of the electronic paper 100.

As illustrated in FIG. 3, the electronic paper 100 includes a communicator 3 in addition to the display panel 10, the temperature sensor 2, and the control device 20 described above. The electronic paper 100 may further include an operation button that receives an input operation by a user. In addition, the electronic paper 100 may include a touch panel, which receives an input operation by a user, on a surface of the display panel 10.

The communicator 3 is, for example, an interface device for wireless communication. The communicator 3 is a network interface controller, for example. The communicator 3 communicates with a personal computer or the like via a communication network such as the Internet or a public telephone network. The communicator 3 is capable of receiving an instruction signal from an instruction terminal (not illustrated) such as a personal computer. The communicator 3 may be capable of transmitting and receiving signals to and from an instruction terminal (not illustrated). The communicator 3 may be, for example, an interface device for wired communication.

The control device 20 includes a controller 21 and a storage 22. The controller 21 includes a processor. The controller 21 includes a central processing unit (CPU), for example. Alternatively, the controller 21 may include a general-purpose computer.

The storage 22 stores data and computer programs. The data includes, for example, image data related to a display image to be displayed on the display panel 10.

The storage 22 includes a main storage device and an auxiliary storage device. The main storage device is a semiconductor memory, for example. The auxiliary storage device is, for example, a semiconductor memory and/or a hard disk drive. The storage 22 may include a removable medium. The controller 21 executes a computer program stored in the storage 22 to perform a write operation and a refresh operation to be described below.

1.3 Details of Controller 21

Next, the controller 21 will be described. The controller 21 includes a display controller 21*a*, a refresh timing determiner 21*b*, and an evaluation value calculator 21*c*.

The display controller 21*a* controls a write operation and a refresh operation. The write operation is an operation of writing an image on the display panel 10. The refresh operation is an operation of performing, after the write operation previously performed, the write operation again.

The refresh timing determiner 21*b* determines a refresh timing at which the refresh operation is performed.

The display controller 21*a* executes the write operation based on image data. The display controller 21*a* executes the write operation within a writable temperature range. The display controller 21*a* executes the write operation by applying a voltage to the color particles 132. Specifically, the display controller 21*a* executes the write operation by applying a write voltage between the first electrode 14 and the second electrodes 15. The writable temperature range is not particularly limited, and is, for example, 0° C. or higher and 50° C. or lower.

The refresh timing determiner 21*b* determines the refresh timing based on the detected temperature T by the temperature sensor 2. The display controller 21*a* executes the refresh operation at the determined refresh timing.

Thus, the refresh timing is determined based on the detected temperature T by the temperature sensor 2. As a result, it is possible to suppress the deterioration of a display quality due to the temperature of installation environment.

The refresh operation is an operation of applying a first voltage V1, which is a voltage corresponding to display gradation after the refresh operation, after applying a second voltage V2 different from the first voltage V1. Thus, the second voltage V2 different from the first voltage V1 is once applied before the application of the first voltage V1 which is a voltage corresponding to original display gradation, and then the first voltage V1 is applied again. As a result, the deterioration of the display quality is effectively suppressed.

Examples of the second voltage V2 include, but are not limited to, a voltage corresponding to the maximum value of the display gradation or a voltage corresponding to the minimum value of the display gradation.

The display gradation after the refresh operation is the same as the display gradation before the refresh operation. Thus, the display gradation identical to the display gradation before the refresh operation is reproduced after the refresh operation. As a result, the deterioration of the display quality is accurately suppressed while the display gradation is maintained.

The controller 21 further includes the evaluation value calculator 21*c*. The evaluation value calculator 21*c* calculates an evaluation value E based on the history of the detected temperature T. The refresh timing determiner 21*b* determines a timing at which the evaluation value E satisfies a first condition as the refresh timing.

Thus, the evaluation value E is calculated based on the history of the detected temperature T, and a timing at which the evaluation value E satisfies the first condition is determined to be the refresh timing. As a result, it is possible to further suppress the deterioration of the display quality due to the history of the temperature of installation environment.

For example, the evaluation value calculator 21*c* may calculate the evaluation value E corresponding to the detected temperature T for each time in the history of the detected temperature T. Here, the first condition is, for example, that a time integration value of the evaluation value E is equal to or greater than a time integration threshold value set in advance.

Thus, the evaluation value E corresponding to the detected temperature T is calculated for each time in the history of the detected temperature T, and a timing at which the time integration value of the evaluation value E becomes equal to or greater than the time integration threshold value set in advance is determined to be the refresh timing. As a result, the deterioration of the display quality can be reliably suppressed even after a long time at a high temperature.

For example, the evaluation value E may be "0" when the detected temperature T is lower than an upper limit value TU of the writable temperature range, or may be a temperature ΔT or higher when the detected temperature T exceeds the upper limit value TU. Where, excess temperature ΔT=detected temperature T-upper limit value TU. Then, the evaluation value calculator 21*c* obtains and integrates the evaluation value E, for example, every hour. However, the calculation method and the integration time interval for the evaluation value E are not limited to the above-described example. For example, the relationship between the excess temperature ΔT and the evaluation value E may be determined in advance such that the evaluation value E increases stepwise in accordance with the magnitude of the excess temperature ΔT. Alternatively, a quadratic function of the excess temperature ΔT (where the coefficient of ΔT2 is positive) may be used.

The display controller 21*a* does not execute the write operation at a temperature higher than the writable temperature range. In addition, the display controller 21*a* does not execute the refresh operation at a temperature higher than the writable temperature range.

The display controller 21*a* does not execute the write operation at a temperature lower than a lower limit value TL of the writable temperature range. In addition, the display controller 21*a* does not execute the refresh operation at a temperature lower than the lower limit value TL.

The write voltage is a voltage corresponding to the display gradation of an image after writing. For example, in a dynamic range of 16 levels of black and white, when the display gradation of a certain pixel in a display image after writing is 5 for example, a voltage corresponding to the display gradation 5 is applied to the pixel. In the write operation, a voltage corresponding to a display gradation of each pixel of a display image after writing is applied to each pixel. When the display gradation of a certain pixel in a display image after writing is 15 (white) for example, a positive maximum voltage (voltage corresponding to the display gradation 15) is applied to the pixel. When the display gradation of a certain pixel in a display image after writing is 0 (black) for example, a negative maximum voltage (voltage corresponding to the display gradation 0) is applied to the pixel.

1.4 Control Method for Electronic Paper 100

Figure 4:
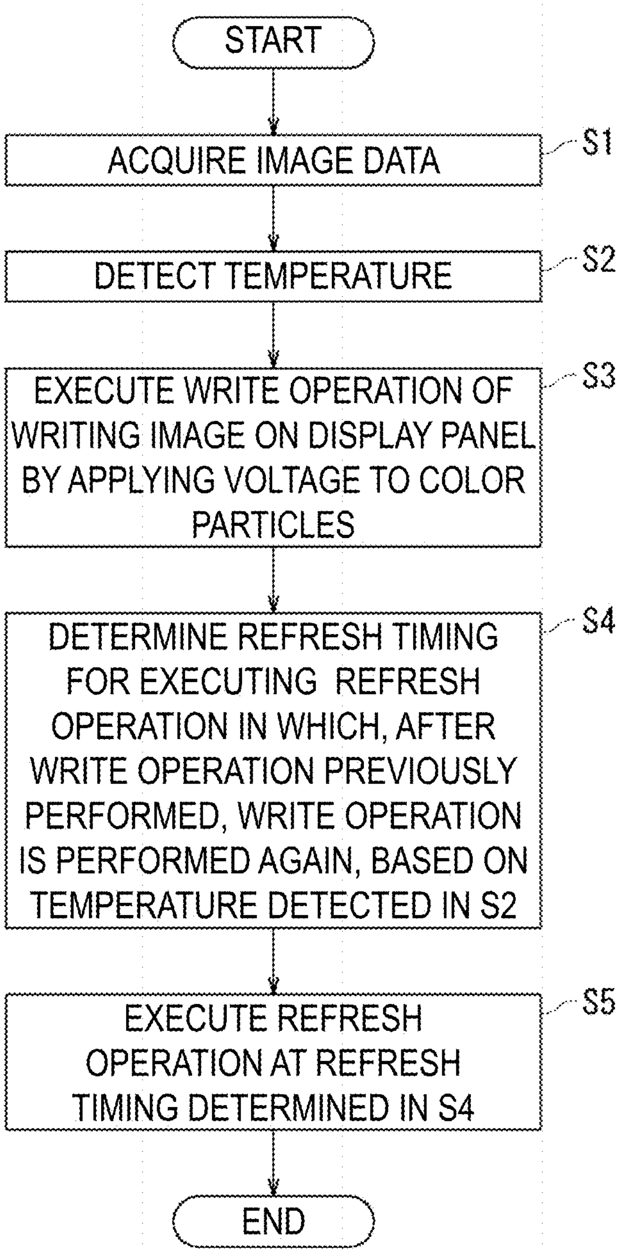
FIG. 4 is a flowchart for explaining a control method for the electronic paper 100.

Next, a control method for the electronic paper 100 according to the present embodiment will be described with reference to FIG. 4. FIG. 4 is a flowchart for explaining a control method for the electronic paper 100. The control method for the electronic paper 100 includes steps S1 to S5. Note that step S2 is an example of "detecting a temperature" according to the disclosure. Step S3 is an example of "executing a write operation" according to the disclosure. Step S4 is an example of "determining a refresh timing" according to the disclosure. Step S5 is an example of "executing a refresh operation" according to the disclosure.

Hereinafter, a control method after the electronic paper 100 receives an instruction to write an image from a user or an instruction terminal will be described with reference to FIG. 4. As described above, the electronic paper 100 includes the display panel 10 including the color particles 132 that move by being applied with a voltage. A write instruction by the user is given by the user operating the electronic paper 100, for example. A write instruction by the instruction terminal is given by transmitting a write signal from the instruction terminal to the electronic paper 100 at a predetermined time, for example.

As illustrated in FIG. 4, in step S1, the controller 21 acquires image data related to a display image after writing. Specifically, the controller 21 acquires the image data related to the display image after writing from the storage 22. The image data may be stored in the storage 22 in advance or may be transmitted from the instruction terminal to the electronic paper 100.

In step S2, the temperature sensor 2 detect a temperature. Specifically, the temperature sensor 2 detects a temperature and transmits the detected temperature T to the controller 21. The controller 21 acquires the detected temperature T by the temperature sensor 2.

In step S3, the display controller 21*a* executes a write operation of writing an image on the display panel 10. The display controller 21*a* executes the write operation by applying a voltage to the color particles 132.

In step S4, the refresh timing determiner 21*b* determines a refresh timing. The refresh timing is a timing for executing a refresh operation in which, after the write operation previously performed, the write operation is performed again, based on the temperature T detected in step S2.

In step S5, the display controller 21*a* executes the refresh operation at the refresh timing determined in step S4.

Thus, the refresh operation is executed based on the detected temperature T. As a result, it is possible to suppress the deterioration of a display quality due to the temperature of installation environment.

1.5 Modification Example of Electronic Paper 100

Figure 5:
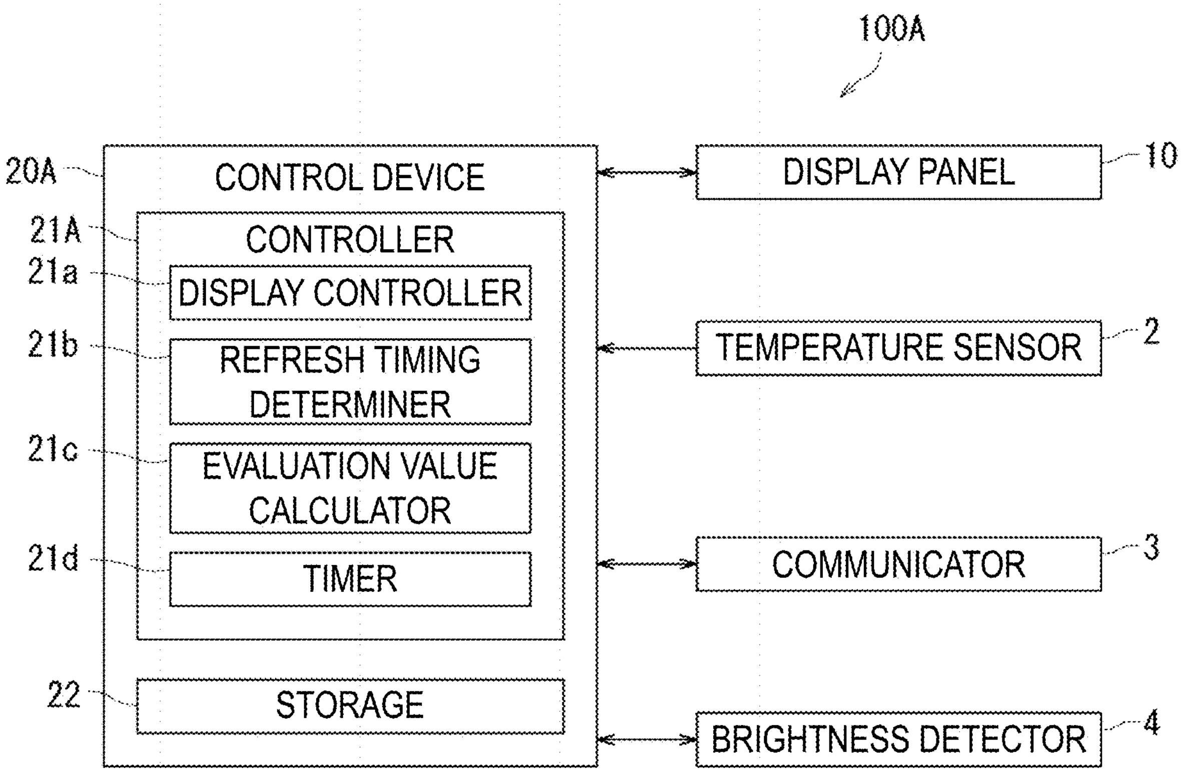
FIG. 5 is a block diagram illustrating a configuration of an electronic paper 100A according to a modification example of the first embodiment of the disclosure.

Next, a modification example of the first embodiment of the disclosure will be described with reference to FIG. 5. FIG. 5 is a block diagram illustrating a configuration of an electronic paper 100A according to a modification example of the first embodiment of the disclosure. Hereinafter, differences from the first embodiment will be mainly described.

As illustrated in FIG. 5, when compared with the configuration of the electronic paper 100 described above, the electronic paper 100A includes a control device 20A instead of the control device 20, and further includes a brightness detector 4. When compared with the control device 20 described above, the control device 20A includes a controller 21A instead of the controller 21. When compared with the controller 21 described above, the controller 21A further includes a timer 21*d*.

The display controller 21*a* executes the refresh operation when a second condition is satisfied at the refresh timing. On the other hand, when the second condition is not satisfied at the refresh timing, the display controller 21*a* suspends the execution of the refresh operation. Thus, the refresh operation is not executed even when the refresh timing comes until the second condition is satisfied. As a result, it is possible to avoid a situation in which the display content of the display panel 10 cannot be temporarily read due to execution of the refresh operation at an improper timing.

When the display controller 21*a* suspends the execution of the refresh operation, the display controller 21*a* executes the refresh operation at a time point when the second condition is satisfied. Accordingly, the suspended refresh operation is executed. As a result, the display quality of the display panel 10 is recovered.

The timer 21*d* measures at least a time t. Here, the second condition is that the time t falls within in a preset time zone. Thus, even when the refresh operation is required to be executed, the refresh operation is not executed until the preset time zone comes. As a result, the refresh operation can be executed in a selected time zone during which no problem occurs even when the display content of the display panel 10 becomes temporarily unreadable.

Examples of the preset time zone include, but are not limited to, midnight and predawn during which there is a high possibility that no one is viewing the display panel 10.

The brightness detector 4 detects the brightness of the surroundings. The second condition is that the brightness detected by the brightness detector 4 is equal to or less than a preset brightness threshold value. Thus, even when the refresh operation is required to be executed, the refresh operation is not executed while the surroundings are bright. As a result, the refresh operation can be executed in a selected state in which no problem occurs even when the display content of the display panel 10 becomes temporarily unreadable, for example, a state in which the surroundings are dark.

Examples of the brightness threshold value include a value corresponding to brightness at which it is difficult to visually recognize the display panel 10, but the brightness threshold value is not limited to such brightness.

The embodiments of the disclosure have been described above with reference to the drawings. However, the disclosure is not limited to the above-described embodiments, and can be implemented in various forms without departing from the gist of the disclosure. In addition, various disclosures can be formed by appropriately combining the plurality of constituent elements disclosed in the above-described embodiments. For example, some of the constituent elements illustrated in the embodiments may be omitted. Furthermore, constituent elements in different embodiments may be appropriately combined. In order to facilitate understanding, the drawings are illustrated schematically, focusing on the respective constituent elements, and thicknesses, lengths, numbers, distances, and the like of the illustrated constituent elements may be different from actual ones for convenience of creating drawings. In addition, the materials, the shapes, the dimensions, and the like of the respective constituent elements illustrated in the above-described embodiments are merely examples and are not particularly limited, and various changes can be made without substantially departing from the advantageous effects of the disclosure.

For example, in the above-described embodiments, an example in which the disclosure is applied to the electronic paper 100 of a microcapsule type including the microcapsules 13 has been described, but the disclosure is not limited thereto. For example, the disclosure may be applied to an electronic paper that does not include the microcapsules 13 but includes the color particles 132. Further, the disclosure may be applied to an electronic paper of a twisting ball type in which the surface of each of color particles is painted in two colors on a hemispherical basis, and a display image is written by rotating the color particles.

The disclosure is useful in the field of electronic papers.

While there have been described what are at present considered to be certain embodiments of the disclosure, it will be understood that various modifications may be made thereto, and it is intended that the appended claim cover all such modifications as fall within the true spirit and scope of the disclosure.

What is claimed is:

1. An electronic paper comprising:

a display panel including color particles that move when applied with a voltage;

a temperature sensor that detects temperature;

a display controller that controls a write operation of writing an image on the display panel by applying the voltage to the color particles;

an evaluation value calculator that calculates an evaluation value based on a history of detected temperatures; and a refresh time determiner that determines a refresh time for executing a refresh operation in which, after the write operation is previously performed, the write operation is performed again, wherein:

the refresh time determiner determines the refresh time based on the temperature detected by the temperature sensor;

the display controller executes the refresh operation at the determined refresh time;

the refresh time determiner determines, as the refresh time, a time at which the evaluation value satisfies a first condition;

the evaluation value calculator calculates the evaluation value corresponding to the detected temperature for each time in the history of the detected temperatures; and the first condition indicates that a time integration value of the evaluation value is equal to, or greater than, a preset time integration threshold value.

2. The electronic paper according to claim 1, wherein the display controller executes the refresh operation when a second condition is also satisfied at the refresh time, and suspends the execution of the refresh operation when the second condition is not satisfied at the refresh time.

3. The electronic paper according to claim 2, wherein, when the display controller suspends the execution of the refresh operation, the display controller executes the refresh operation at a time at which the second condition is satisfied.

4. The electronic paper according to claim 2, further comprising:

a timer that measures a time, wherein the second condition comprises the time falling within a preset time zone.

5. The electronic paper according to claim 2, further comprising:

a brightness detector that detects a brightness of surroundings, wherein the second condition comprises the brightness detected by the brightness detector being equal to, or less than, a preset brightness threshold value.

6. The electronic paper according to claim 1, wherein the refresh operation is an operation of applying a first voltage, which is a voltage corresponding to a display gradation after the refresh operation, after applying a second voltage different from the first voltage.

7. The electronic paper according to claim 6, wherein the display gradation after the refresh operation is identical to a display gradation before the refresh operation.

8. An electronic paper comprising:

a display panel including color particles that move when applied with a voltage;

a temperature sensor that detects temperature;

a display controller that controls a write operation of writing an image on the display panel by applying the voltage to the color particles;

an evaluation value calculator that calculates an evaluation value based on a history of detected temperatures; and a refresh time determiner that determines a refresh time for executing a refresh operation in which, after the write operation is previously performed, the write operation is performed again, wherein:

the refresh time determiner determines the refresh time based on the temperature detected by the temperature sensor;

the display controller executes the refresh operation at the determined refresh time;

the refresh time determiner determines, as the refresh time, a time at which the evaluation value satisfies a first condition;

the display controller executes the refresh operation when a second condition is also satisfied at the refresh time; and suspends the execution of the refresh operation when the second condition is not satisfied at the refresh time, and when the display controller suspends the execution of the refresh operation, the display controller executes the refresh operation at a time at which the second condition is satisfied.

9. An electronic paper comprising:

a display panel including color particles that move when applied with a voltage;

a temperature sensor that detects temperature;

a display controller that controls a write operation of writing an image on the display panel by applying the voltage to the color particles;

an evaluation value calculator that calculates an evaluation value based on a history of detected temperatures;

a refresh time determiner that determines a refresh time for executing a refresh operation in which, after the write operation is previously performed, the write operation is performed again; and a brightness detector that detects a brightness of surroundings, wherein:

the refresh time determiner determines the refresh time based on the temperature detected by the temperature sensor;

the display controller executes the refresh operation at the determined refresh time;

the refresh time determiner determines, as the refresh time, a time at which the evaluation value satisfies a first condition;

the display controller executes the refresh operation when a second condition is also satisfied at the refresh time, and suspends the execution of the refresh operation when the second condition is not satisfied at the refresh time; and the second condition comprises the brightness detected by the brightness detector being equal to, or less than, a preset brightness threshold value.

* * * * *